(12) United States Patent
Williams et al.

(10) Patent No.: US 6,384,948 B1
(45) Date of Patent: May 7, 2002

(54) HIGH-SENSITIVITY, HIGH-SPEED DIGITAL OPTICAL PHOTORECEIVER

(75) Inventors: Keith J. Williams, Accokeek, MD (US); Ronald D. Esman, Burke, VA (US); Carl A. Villarruel, Burke, VA (US); Michael L. Dennis, Burke, VA (US); Irl N. Duling, III, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/163,397

(22) Filed: Sep. 30, 1998

(51) Int. Cl.⁷ .................................................. H01S 3/00
(52) U.S. Cl. ....................... 359/189; 359/194; 359/195; 359/341
(58) Field of Search ................................. 359/189, 195, 359/154, 160, 341, 194

(56) References Cited

U.S. PATENT DOCUMENTS

| | | | |
|---|---|---|---|
| 4,963,832 A | 10/1990 | Desurvire et al. | 359/341 |
| 5,039,190 A | 8/1991 | Blonder et al. | 359/341 |
| 5,177,634 A | 1/1993 | Way | 359/341 |
| 5,179,461 A | 1/1993 | Blauvelt et al. | 359/189 |
| 5,239,607 A | 8/1993 | da Silva et al. | 359/341 X |
| 5,452,124 A | 9/1995 | Baker | 359/341 |
| 5,457,562 A | 10/1995 | Tremblay | 359/188 |
| 5,546,213 A | 8/1996 | Suyama | 359/179 |
| 5,563,731 A | 10/1996 | Asahi | 359/341 |
| 5,563,733 A | 10/1996 | Mitsuda et al. | 359/341 |
| 5,623,362 A | 4/1997 | Mitsuda et al. | 359/341 |
| 5,675,428 A | 10/1997 | Henmi | 359/161 |
| 5,706,124 A | 1/1998 | Imoto et al. | 359/341 |

OTHER PUBLICATIONS

K. Hagimoto et al., "Twenty–Gbit/s signal transmission using a simple high–sensitivity optical receiver", *OFC '92*, paper Tu13, 1992.
R.I. Laming et al., "High–Sensitivity Two–Stage Erbium––Doped Fiber Preamplifier at 10Gb/s", *IEEE Photonic Tech. Lett.*, vol. 4, p. 1348–1350, 1992.
T. Ducellier et al., "Compact high sensitivity 10 Gbit/s SOA–filter–pin receiver module," *Electronics Letters*, vol. 33, No. 6, pp. 509–510, Mar. 1997.
Y. Miyamoto et al., "Ultra High Speed Optical Receiver with Uni–Traveling–Carrier Photodiode acting as a Logic IC Driver", *IEEE Technical Digest*, Sep. 1997, paper PD2.11.
J.C. Livas, "High Sensitivity Optically Preamplified 10 Gb/s Receivers," *OFC '96*, Paper PD–4, 1996.

*Primary Examiner*—Thomas Mullen
(74) *Attorney, Agent, or Firm*—John J. Karasek; John G. Mills (57) ABSTRACT

An optical receiver for receiving a signal from an optical fiber in a fiber-optic digital transmission system that includes a first low noise optical amplifier to amplify an input optical signal. The first low noise optical amplifier has an input 3 dB compression point lower than the desired system input sensitivity at a desired bit rate. A high power optical amplifier further amplifies the amplified optical signal, and has an automatic gain control for output signal leveling at a desired operation point of the transmission system. A high current photodetector converts the further amplified optical signal from the high power optical amplifier to an electrical signal that drives a retiming circuit without requiring further amplification of the electric signal.

27 Claims, 5 Drawing Sheets

HIGH-SENSITIVITY, HIGH-SPEED DIGITAL OPTICAL PHOTORECEIVER

BACKGROUND OF THE INVENTION

1. Field of the Invention

The present invention relates to high speed optical digital transmission systems in general, and more particularly, the present invention relates to an optical photoreceiver in a fiberoptic digital transmission system.

2. Description of the Related Art

Figure 1:
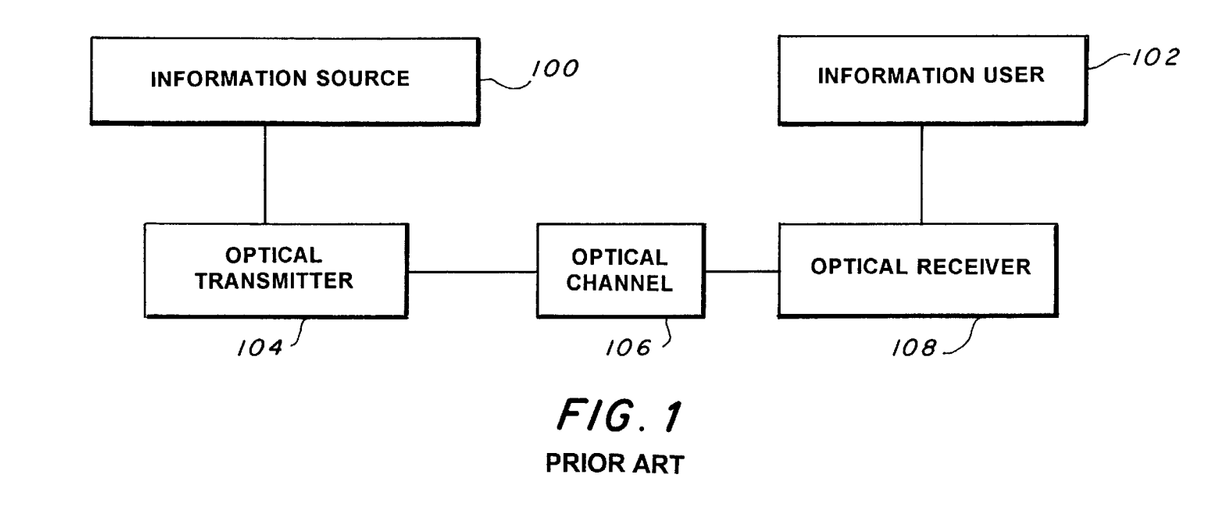
FIG. 1 is a schematic view of a basic prior art optical communication system.

The transmission of speech, data, video and other information using the visible and infrared portion of the electromagnetic spectrum is commonly known as optical communication. A basic optical communication system is illustrated in FIG. 1. Information is transmitted from an information source 100 to an information user 102 using an optical transmitter 104, an optical channel 106, and an optical receiver 108. The most common light source used as an optical transmitter 104 generally includes a light emitting diode, a laser diode or a laser and modulator pair. The optical channel 106, which refers to a transmission path between the optical transmitter 104 and the optical receiver 108, is a glass fiber made of silicon dioxide. Some optical fibers are also made of transparent plastic. Finally, the optical receiver 108 is generally a semiconductor photodiode, with the two most commonly used semiconductor photodiodes being the p-i-n photodiode and the avalanche photodiode.

When analog signals, such as voice, are transmitted digitally, the transmission rate, or bit rate is dependent upon both a rate at which the analog signal is sampled and a coding scheme that is used. The analog signal can be accurately transmitted if the signal is sampled at a rate of at least twice the highest frequency contained in that signal. For example: since most of the energy in normal speech is contained in frequencies below 4 kHz, standard telephone channels need only transmit messages with frequencies up to 4 kHz. Therefore, the standard 4 kHz telephone channel is sampled 8000 times a second, and since a decoding procedure uses 8 bits to describe the amplitude of each sample, a total of 64,000 bits/second are transmitted for a single telephone message.

Random fluctuations in a received signal are commonly referred to as "noise". One of the problems associated pith optical receivers in telecommunications systems involves the existence of noise at the photoreceiver side. For example, when a low level of light is detected directly in a photodiode, the electrical signal level generated by the photodetector is too low, or is small compared to thermal noise at an output of the photodetector. As a result, the signal is lost in the noise. For a typical p-i-n photodiode, this loss limits the sensitivity of the photodiode to −30 dBm of optical power at the input in order to maintain a reasonable bit error rate at 1 Giga-bit per second (Gbps). Therefore, in order to increase the data transmission rate above 1 Gbps, it is necessary to amplify the signal before the signal reaches the photodetection stage.

Although many attempts have been made, increasing the transmission rate in conventional telecommunication systems has proven to be problematic. For example, an avalanche photodiode, which has been used to increase the transmission rate, is limited to a net gain-to-noise ratio of approximately 10, which limits the avalanche photodiode to a transmission rate of approximately 10 Gbps. As a result, in order to extend the transmission rate to 100 Gbps using the avalanche or pin photodiodes, it is necessary to include optical preamplification. Conventional use of optical preamplification relies on post detection amplification, or amplification of the signal after the signal has been detected, which tends to be very difficult. To give a specific example, since significant low frequency information is contained in the data, it is necessary to have an electrical amplifier positioned after the photodetector that is both broadband (10 GHz bandwidth, for example) and that has a low frequency cut-off in the 10 kHz range. Because of the multiple decade difference that exists between the two ranges, constructing an electrical amplifier having those properties has been difficult. As a result, increasing the data transmission rate above 10 Gbps has proven to be a very demanding and difficult task.

Figure 2:
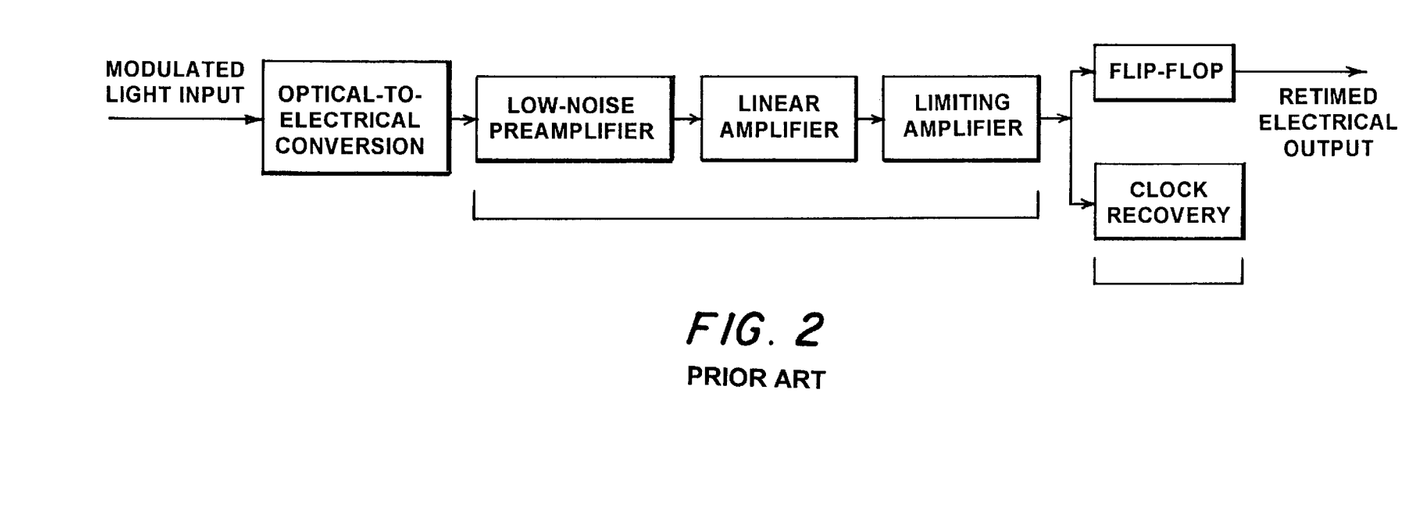
FIG. 2 is a schematic view of a prior art conventional optical receiver.

A conventional optical receiver is illustrated in FIG. 2. An incoming intensity modulated light signal is detected and converted to an electrical pulse stream, or electrical signal by a photoreceiver 20, such as a p-i-n photodiode or an avalanche photodiode. The electrical signal is amplified by a low-noise preamplifier 30 and a linear amplifier 34. The signal is further amplified and leveled by a limiting amplifier 32. The electrical signal from the limiting amplifier 32 is input to a retiming stage 22 that includes a clock recovery circuit 24 and a retiming circuit. or flip flop 26. After receiving the electrical signal, the retiming stage 22 outputs a retimed electrical signal.

As a result of standards which have been developed for a synchronous optical network, commonly referred to as the "SONET" standards, a received optical power level of −30 dBm (1 micro W) is required at a data rate of, for example, 10 Gbps. Therefore, the photoreceiver output electrical signal is usually in a range of tens of microvolts. Typically, the highest frequency for which the sensitivity of a photoreceiver utilizing a p-i-n photodiode is better than −30 dBm, is approximately 1 Gbps. As the frequency of transmission is increased to 10 Gbps, the power level necessarily increases to approximately −20 dBm, and to −10 dBm when the transmission rate is increased to 100 Gbps, due to the thermal noise at the output of the photoreceiver.

The electrical signal from the photoreceiver 20 is usually below the required output level needed by the clock recovery 22 and the flip flop 24. Thus, once the digital signal is converted to an electrical signal, the electrical signal is amplified in an electrical amplification stage 28 prior to being input to the retiming stage 22. The electrical amplification stage 28 includes a low noise preamplifier 30, a limiting amplifier 32, and in some cases a linear amplifier 34. The amount of amplification is dependent upon the input optical signal level, the conversion factor of the photoreceiver 20, and the signal level required for the limiting amplifier 32.

The preamplifier 30 of the amplification stage 28 is a fixed gain low noise amplifier. The limiting amplifier 32 amplifies the signal from the preamplifier 30 and linear amplifier 34, with variable gain, to adjust the gain to a fixed level. The signal is further processed in order to recover the timing in the retiming stage 22 using the clock recover circuit 24. The recovered clock is input to the flip flop 26 and used to reshape and retime the amplified digital data stream to account for pulse distortion and broadening so that the integrity of the data is preserved after many, possibly thousands of retiming/regenerating operations. The electrical amplification stage 28 provides a fixed output electrical signal, typically in the range of 1 volt peak-to- peak, which is needed by the clock recovery circuit 24 and flip flop 26 to reliably extract information.

Since light is attenuated as it travels in a fiber, the electrical gain required in conventional intensity modulated digital fiber optic systems is usually high. As described above, typical photoreceiver optical input sensitivities are −30 dBm at 1 Gbps for a bit error ratio of $1.0\times10^{-9}$ with a p-i-n photodiode integrated with a low noise preamplifier, and −36 dBm for the same system operating with an avalanche photodiode. With an input of one microwatt (−30 dBm), the photocurrent produced can be as high as 1 $\mu$A through 50 ohms. Therefore, the electrical power out of the photodetector is −76 dBm. A typical flip flop requires at least 100 mV (−16 dBm) to operate reliably, which yields a minimum of 60 dB electrical gain. The gain increases to 80 dB when 1 volt is needed for the flip flop. In addition, it is desirable for the photodetector to work when the optical input signal is as high as −10 dBm, which would yield an optical system with a 20 dB dynamic range (−10 to −30 dBm). When the optical power increases to −10 dBm, the electrical gain must decrease by 40 dB for the output power from the limiting amplifier to remain constant. As a result, the operating gain range of the limiting amplifier must be twice that of the optical dynamic range.

At a transmission rate of 100 Gbps or more, it is difficult to obtain an input sensitivity of −30 dBm using the typical prior art electronic receiver of FIG. 2 without the addition of some sort of optical gain or avalanche gain in the photoreceiver prior to the electrical amplification. But, as described above, the avalanche photodiode is limited to approximately 10 Gbps. Furthermore, as bit rates increase above 1 Gbps, the minimum optical input signal level must also increase so that the same bit-error-ratio is maintained. This requirement is a fundamental limitation of p-i-n photodiodes operating at low light levels because the electrical signal level generated by the photodiode is very close to the thermal noise floor of the input electronic preamplifier, and therefore, as the bandwidth of the system increases, the bandwidth of the noise in the preamplifier must also increase, and therefore the input optical signal must increase. As a result, using conventional optical receivers to obtain a transmission rate of 100 Gbps or more is problematic.

BRIEF SUMMARY OF THE INVENTION

It is therefore, an object of the present invention to provide a high speed fiber-optic digital receiver for information at an operating rate from 1 Megabit per second (Mbps) to over 100 Gbps.

It is a further object of the present invention to provide a high speed fiber-optic digital transmission system that obtains an amplitude limited output voltage greater than one volt directly from a photodetector without addition of linear or gain-control electrical amplification stages.

Additional objects and advantages of the present invention will be set forth in part in the description which follows, and, in part, will be obvious from the description, or may be learned by practice of the invention.

Objects of the invention are achieved by an apparatus that includes a first optical amplifier which amplifies an optical signal, and a high current photodetector which converts the amplified optical signal into an electrical signal.

Further objects of the invention are achieved by an optical receiver for receiving a signal from an optical fiber in a fiber-optic digital transmission system. The optical receiver includes a first optical amplifier which amplifies the signal, a high current photodetector which converts the amplified signal to an electrical signal, and a retiming circuit which is driven by the electrical signal. The first optical amplifier amplifies the signal so that the electrical signal from the high current photodetector has a power level sufficient to drive the retiming circuit without requiring further amplifications Further objects of the invention are achieved by an optical receiver for receiving an optical signal from an optical fiber in a fiber-optic digital transmission system that includes a first optical amplifier to amplify the optical signal. The first optical amplifier has an input 3 dB compression point lower than the desired input sensitivity at a desired bit rate. A second optical amplifier further amplifies the amplified optical signal. The second optical amplifier has an automatic gain control for output signal leveling at a desired operation point of the transmission system. A high current photodetector converts the further amplified optical signal from the second optical amplifier to an electrical signal that drives a retiming circuit. The electrical signal from the high current photodetector has a power level sufficient to drive the decision circuit without requiring further amplification, and output signal levels of the high current photodetector are approximately equal to 1 volt peak-to-peak, 0.5 volts peak-to-peak, and 0.25 volts peak-to-peak for systems with data rates of 1 to 10 Gbps, 10 to 40 Gbps, and 40 to 100 Gbps, respectively.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 3:
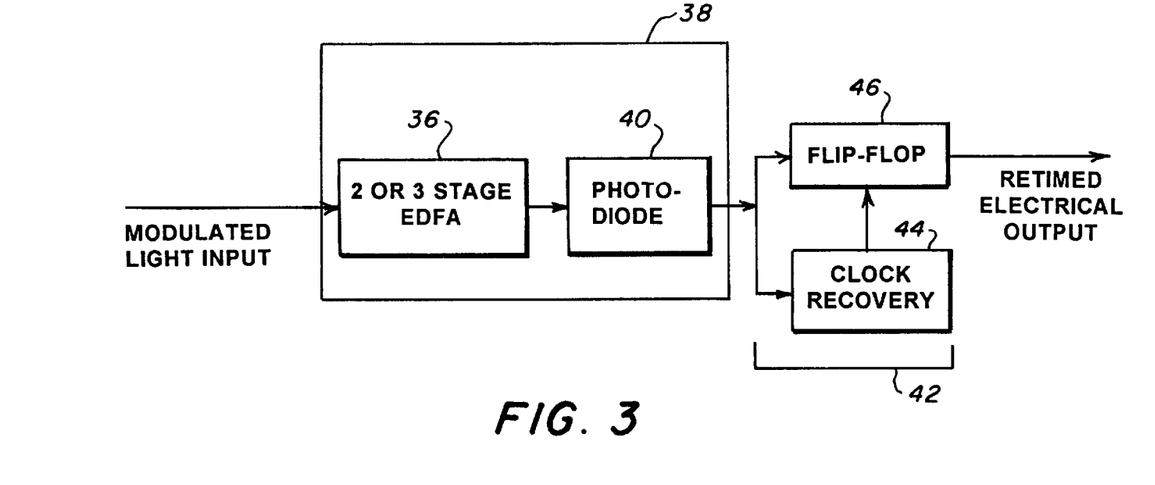
FIG. 3 is a schematic view of an optical receiver according to an embodiment of the present invention.

An optical photoreceiver 38 according to a preferred embodiment of the present invention is illustrated generally in FIG. 3. The optical photoreceiver 38 includes a two or possibly three stage Erbium doped fiber amplifier (EDFA) 36, depending upon requirements of a specific system, and a high current photodiode 40. An input, usually a 1.55 micron amplitude modulated light input, is amplified by the EDFA 36, and the amplified optical signal is converted to an electrical signal by the high current photodiode 40. The EDFA 36 is used to provide high sensitivity, and has the advantage of being very broadband (hundreds of Gbps), and very sensitive, with state of the art systems reaching to within 7 to 10 dB of the theoretical limit for intensity modulated systems. The bandwidth is limited only by the bandwidth of the erbium of the EDFA, which has a very low frequency (less than 10 kHz, typically) cutoff, and a virtually unlimited upper frequency (exceeding 1 Terahertz).

The incident light is amplified with the EDFA 36 up to a constant level using the gain saturation properties of the EDFA as a primary signal leveling mechanism and electrical control of the final stage pump power as a secondary signal leveling mechanism. The leveled output of the EDFA 36 illuminates the high current photodiode 40, converting the light to an electrical signal that is fed to the input of a retiming stage 42 that includes a clock recovery circuit 44 and a retiming circuit, or flip flop 46. Since the average incident light is leveled, or constant, the dc or average electrical signal out of the high current photodiode 40 is also constant and independent of the incident light level. Typical digital coding schemes lead to leveled, or constant, peak powers and leveled peak electrical signals. The range of input optical powers that result in a leveled output power is the dynamic range of the EDFA 36. A third EDFA stage may be necessary to increase dynamic range depending on systems requirements. The output power from the EDFA 36 will be large enough so that after conversion to an electrical signal by the high current photodetector 40, a peak-to-peak output voltage of 0.1 to 3.0 volts is generated without further amplification. The exact level of the output power will be determined by requirements of the clock recovery 44 and flip flop 46 circuitry that is used.

Figure 4:
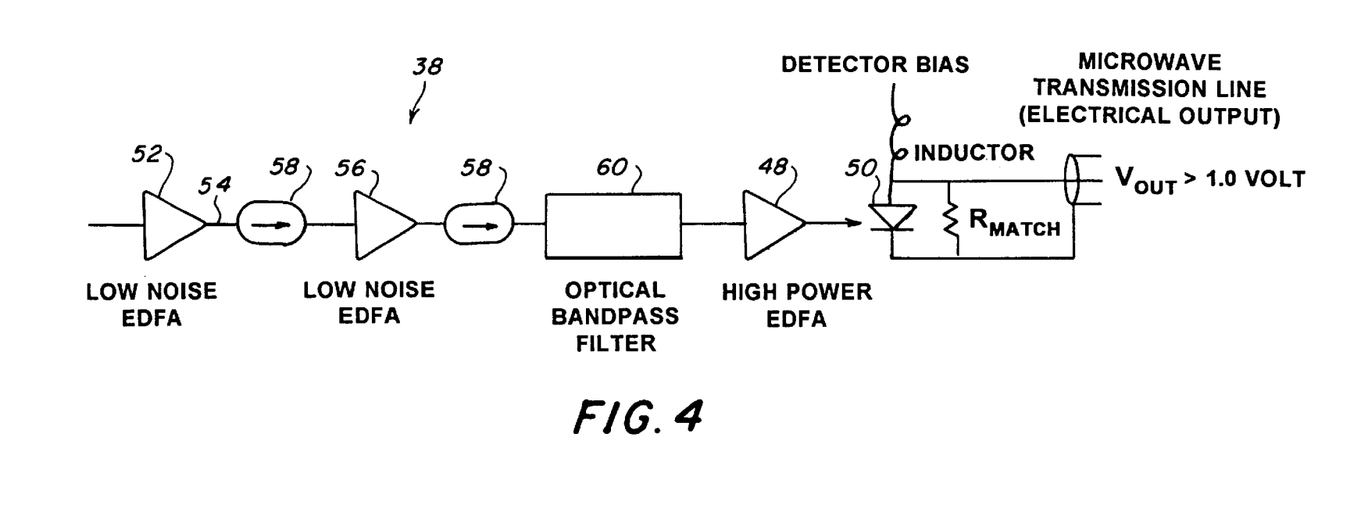
FIG. 4 is a detailed schematic view of the optical receiver of FIG. 3 according to an embodiment of the present invention.

FIG. 4 is a more detailed illustration of the optical photoreceiver 38 of FIG. 3. As illustrated in FIG. 4, an optical photoreceiver according to a preferred embodiment of the present invention includes a high power EDFA 48 that delivers enough power directly to a high current photodetector 50 so that an output signal from the high current photodetector 50 is at a level that makes post-detection amplification unnecessary. The output power of the high power EDFA 48 must be sufficient to drive the high current photodetector 50 to a desired current level. For example, given that the quantum efficiency of the high current photodetector 50 is typically between 0.5 and 1.0 Amps/Watt at 1500 nm, the output power from the high power EDFA 48 must be from about 2.5 to about 80 mW, depending on duty cycle and impedance matching conditions. A 40 mW amplifier is readily constructed with one 120 mW 980 nm single mode pump laser with present single mode erbium doped fiber technology. As a lower cost and higher power alternative, double clad fibers can be used with low cost broad stripe laser pumping to achieve output powers over 100 mW.

In addition, the high power EDFA 48 also implements some automatic gain control for output signal leveling at an operating point of interest. The level of gain control necessary is dependent upon implementation factors such as current needed, bit rate, the decision circuit used, responsivity or efficiency of the high current photodetector 50, type of impedance matching used, and so forth. Thus, the high power EDFA 48 provides the additional function of clamping the output signal level due to gain compression, and to further level the output voltage by adjusting the pump power to compensate for small changes in electrical signal levels. The time constant for pump power manipulation and gain compression is slow, on the order of 500 Hz to 1 kHz, which is desirable in digital systems with long pseudorandom bit streams (or significant low frequency content), because a long series of logical zeros or ones could be interpreted as a change in input average optical power level if faster automatic gain control is used. Therefore, the high power EDFA 48 low frequency cutoff of less than 10 kHz is ideal for digital systems. In addition, EDFAs are very broadband and have very low gain variation and/or ripple for bandwidths less than 100 GHz (0.8 nm).

The high current photodetector 50 is a device which, like an ordinary photodetector, converts light energy into electric current. The high-current distinction implies that sufficient current is photogenerated and delivered to the load impedances of the decision and clock recovery circuits such that error-free decision making and low-jitter clock recovery can be accomplished, without the need for post-detection electronic amplification following the high current photodetector 50. For standard logic families operating above 1 Gbps, such as GaAs, Silicon-based ECL, AlGaAs/GaAs HBTs, or HEMT technology, and for PLL-based clock recovery circuits this requires signal levels of approximately 250 to 1000 mV peak-to-peak input to the circuits. For reasons usually associated with power dissipation in the circuits, the signal level requirements are a weak function of bit-rate, where signal levels for higher bit rates are necessarily reduced. For systems with data rates of 1 to 10 Gbps, 10 to 40 Gbps, and 40 to 100 Gbps, the typical signal levels that are required are 1 Volt peak-to-peak, 0.5 volts peak-to-peak, and 0.25 Volts peak-to-peak, respectively. Lower levels can be used with high-sensitivity circuits, but this can lead to worse noise immunity. In addition, these high-sensitivity circuits may be difficult or expensive to obtain.

As a result, while still maintaining the necessary system functions of linear gain, gain control, and high output signal levels, etc., the high power EDFA 48 supplies sufficient power to drive the high current photodetector 50 to a desired current level, without the need for amplification of the electrical signal out of the high current photodetector 50.

As illustrated in FIG. 4, in a preferred embodiment of the present invention, the optical photoreceiver may also include a preamplifier stage that includes a low noise EDFA 52. As the optical signal travels along an optical transmission path 54, the optical signal is amplified by the low noise EDFA 52, and the resulting amplified signal is then further amplified by the high power EDFA 48. In a preferred embodiment of the present invention, the low noise EDFA 52 has an input compression point lower than the desired input sensitivity at a bit rate of interest, which results in a very low input compression point. In addition to the low input compression point, the low noise EDFA 52 should have a noise figure that is less than 5 dB, although it is not necessary in all cases.

According to another preferred embodiment of the present invention, in addition to being amplified by the low noise EDFA 52, the optical signal may also be further amplified by an intermediate stage that includes a low noise EDFA 56 that provides linear gain. As a result of the large amount of gain already provided by the low noise EDFA 52 of the preamplifier stage, the noise figure may be somewhat relaxed in the intermediate stage, and therefore, in a preferred embodiment of the present invention, the noise figure of the low noise EDFA 56 of the intermediate stage may practically be less than or equal to 10 dB.

Isolators 58 are also positioned between EDFAs, along the optical transmission path 54. For example, when both the preamplifier stage and the intermediate stage are utilized, isolators are positioned between the low noise EDFA 52 of the preamplifier stage, the low noise EDFA 56 of the intermediate stage, and the high power EDFA 48 to isolate directional flow of the amplified optical signal. When the intermediate stage is not utilized, the isolator 58 is positioned between the low noise EDFA 52 of the preamplifier stage and the high power EDFA 48. In addition, an optical bandpass filter 60, if needed, would be positioned along the optical transmission path 54 between the preamplifier stage and the intermediate stage, or between the intermediate stage and the high power EDFA 48. When the intermediate stage is not utilized, the bandpass filter 60 is positioned between the low noise EDFA 52 of the preamplifier stage and the high power EDFA 48.

The bandpass filter 60 is a primary noise filter and serves multiple functions. For example, the bandpass filter 60 is preferably sufficiently broad in bandwidth to full) pass the optical signal, while at the same time cutting off any spurious optical signals that are outside of a desired optical signal band. In this way, the bandpass filter 60 will cut off amplified spontaneous emission that would create noise, in addition to cutting off any adjacent channels in a wavelength division multiplexed system. The bandpass filter 60 is not necessarily required for single channel optical systems, but is nonetheless advantageous.

As illustrated in FIG. 4 broadband impedance matching of the high impedance of the high current photodetector 50 to flatten frequency response is accomplished by placing a matching resistor $R_{match}$ in parallel with the high current photodetector 50 close (less than 5 mm) to the terminals of the photodetector 50. When the transmission line is a 50 ohm transmission line, the optimum matching resistor $R_{match}$ is a 50 ohm resistor. While this resistive match has the highest signal loss, it provides the best match over a very broad bandwidth. Other higher impedance matching resistors can be used at the expense of a degraded match. Generation of 1 volt peak-to-peak in a 50 ohm load requires 20 mA peak-to-peak through the load, or 40 mA peak-to-peak from the photodetector. Depending on the gain ripple that is required and the impedance match of the remainder of the system, according to the present invention the resistive match may not be required in all systems.

Since the high current photodetector 50 outputs a specific current, if an impedance matching resistor $R_{match}$ is placed across the high current photodetector 50, a portion of the current goes to the decision circuit in use, and the remainder of the current goes through the impedance matching resistor $R_{match}$. Therefore, since the voltage level that the decision circuit sees is reduced by a factor of two in the case of a 50 ohm match, it is desirable to eliminate the need for the impedance matching resistor $R_{match}$. One way to eliminate the need for impedance matching would be to match the high current photodetector 50 to the decision circuits and the clock recovery circuits.

Figure 5:
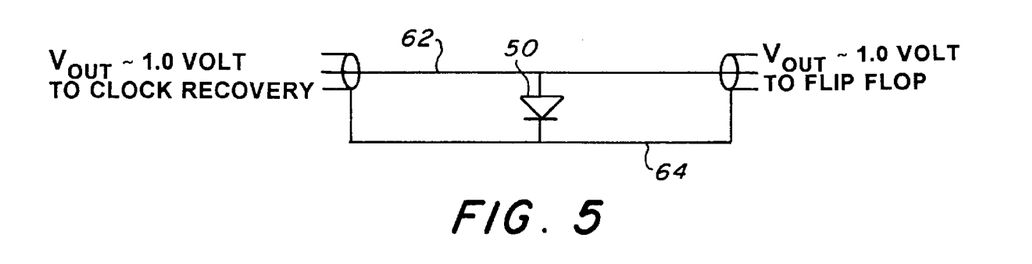
FIG. 5 is a schematic view of impedance matching according to an embodiment of the present invention.

FIG. 5 is a schematic view of impedance matching according to an embodiment of the present invention, in which the high current photodetector 50 is impedance matched with the decision circuits and the clock recovery circuits. The characteristic impedance of a photodiode, or impedance that the photodiode presents in a microwave distributed system, is fairly high, typically above 1000 ohms. Therefore, as far as the microwave signals are concerned, the impedance may be considered infinite. Since the present invention eliminates the need for electronic amplification, it may be possible to place the high current photodetector 50 between two transmission lines 62 and 64, as illustrated in FIG. 5, so that a distance between the photodetector 50 output to the clock recovery circuit 44 (FIG. 3) and the output to the flip flop 46 (FIG. 3) is small, such as less than ¼ of a wavelength of the highest frequency component of the microwave signal, then the high current photodetector 50 does not need to be matched to the flip flop circuits and the clock recovery circuits.

Therefore, as illustrated in FIG. 5, if the transmission line can be accessed, keeping the distance between the broken transmission lines very short, and the high current photodetector 50 is placed between the transmission lines 62 and 64, a matching impedance would no longer be necessary. In this way, by using the clock recovery circuit 44 as the impedance match for the flip flop 46, and keeping the distance between the high current photodetector 50 and the flip flop 46, and the distance between the high current photodetector 50 and the clock recovery circuit 44 short, impedance matching can be accomplished without the use of the impedance matching resistor $R_{match}$. As a result, since half of the current is no longer lost to the impedance matching resistor $R_{match}$, the electrical power required to operate the circuit and the optical power required from the High Power EDFA 48 is reduced by 50%, resulting in a reduction in operation costs.

Figure 6:
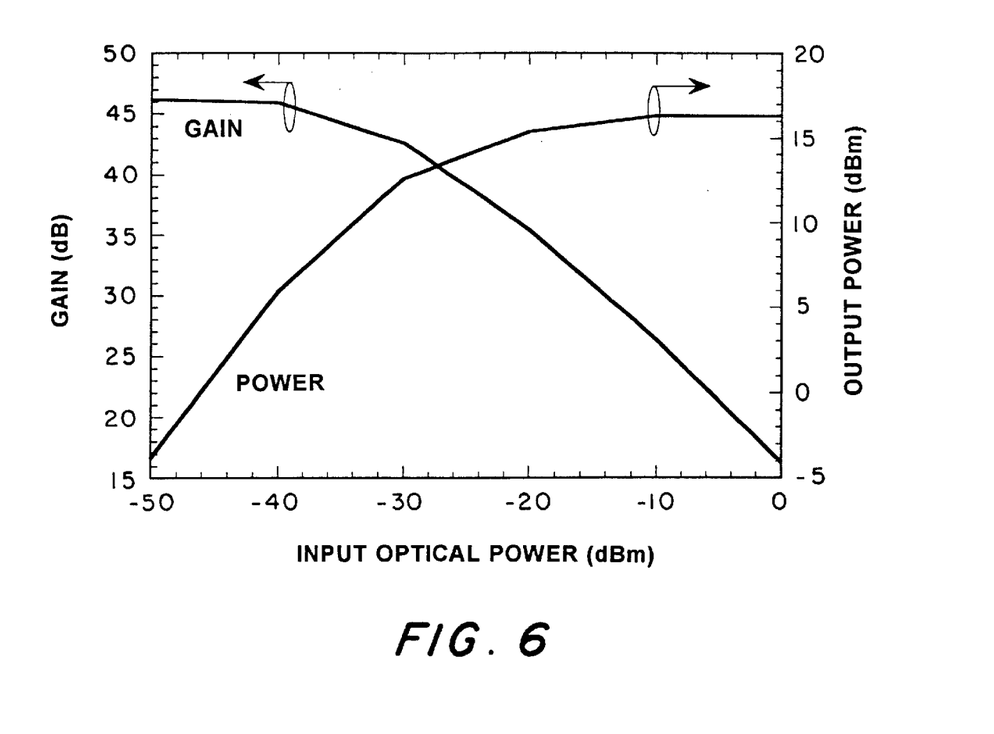
FIG. 6 is a graphical view of the gain and output power of an amplifier in FIG. 6A, according to an embodiment of the present invention.
Figure 6A:
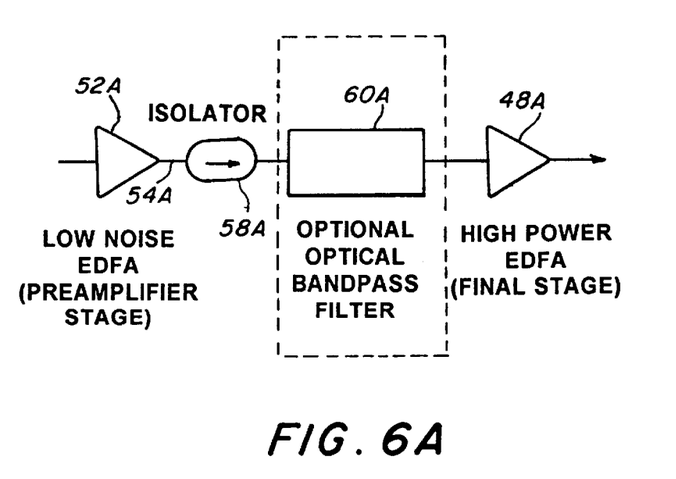
FIG. 6A is a detailed schematic of a two-stage optical amplifier.

FIG. 6A is an illustration of an amplifier according to an embodiment of the present invention. An optical signal is received by a low noise EDFA 52A. The optical signal travels along an optical transmission path 54A. Optical isolators 58A are positioned between EDFA As along the optical transmission path 54A and serve to isolate the optical signal. 48A is a high power EDFA. 60A is a bandpass filter and is placed between gain stages 52A and 48A.

Sufficient gain is provided by the two stage EDFA 36 (FIG. 3) if optoelectronic gain control is performed by controlling the pump of the second stage, that is, by turning down the pump to clamp the output of +12 dBm. The second stage pump control is accomplished by sensing input or output optical power and adjusting pump current using electronic circuitry. In this way, only 3 or 4 dB of control range is required to properly operate the amplifier over an input range of −30 dBm to 0 dBm, a 30 dB range, and provide an output with variations of less than 3 dBm. Only a secondary control is needed in order to accomplish this range, and therefore only a two stage amplifier is necessary, particularly if the bandpass filter 60A is placed between the two stages.

Figure 7:
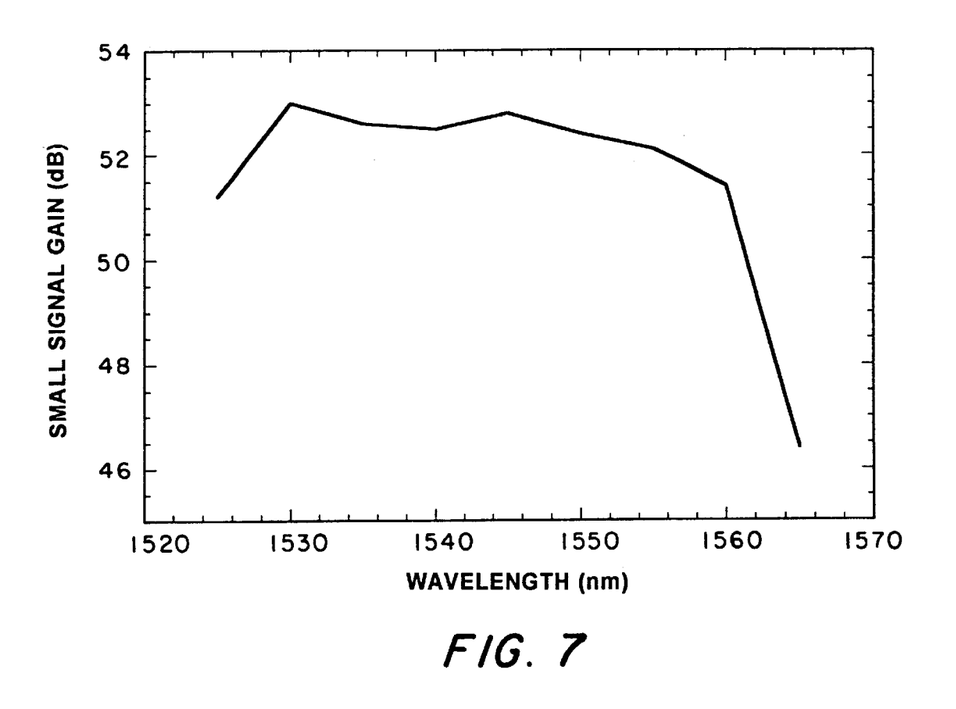
FIG. 7 is a graphical illustration of the effect of placing a bandpass filter between stages of the amplifier of FIG. 6A, according to an embodiment of the present invention.

The effect of placing the bandpass filter 60A between stages of the amplifier is illustrated in FIG. 7. For example, when a 1 nm tunable bandpass filter is positioned between the gain stages 52A and 48A of the amplifier of FIG. 6A, the gain increases approximately 6 dB from the maximum gain of approximately 46 dB of the amplifier in FIG. 6A. Therefore, as illustrated in FIG. 7 by placing the bandpass filter 60A (as shown in FIG. 6A) between the gain stages 52A and 48A (FIG. 6A), approximately 6 dB of additional gain is realized. In this way, the input compression point is decreased by 6 dB, resulting in EDFA 48A being further in compression at −30 dBm input power.

Figure 8:
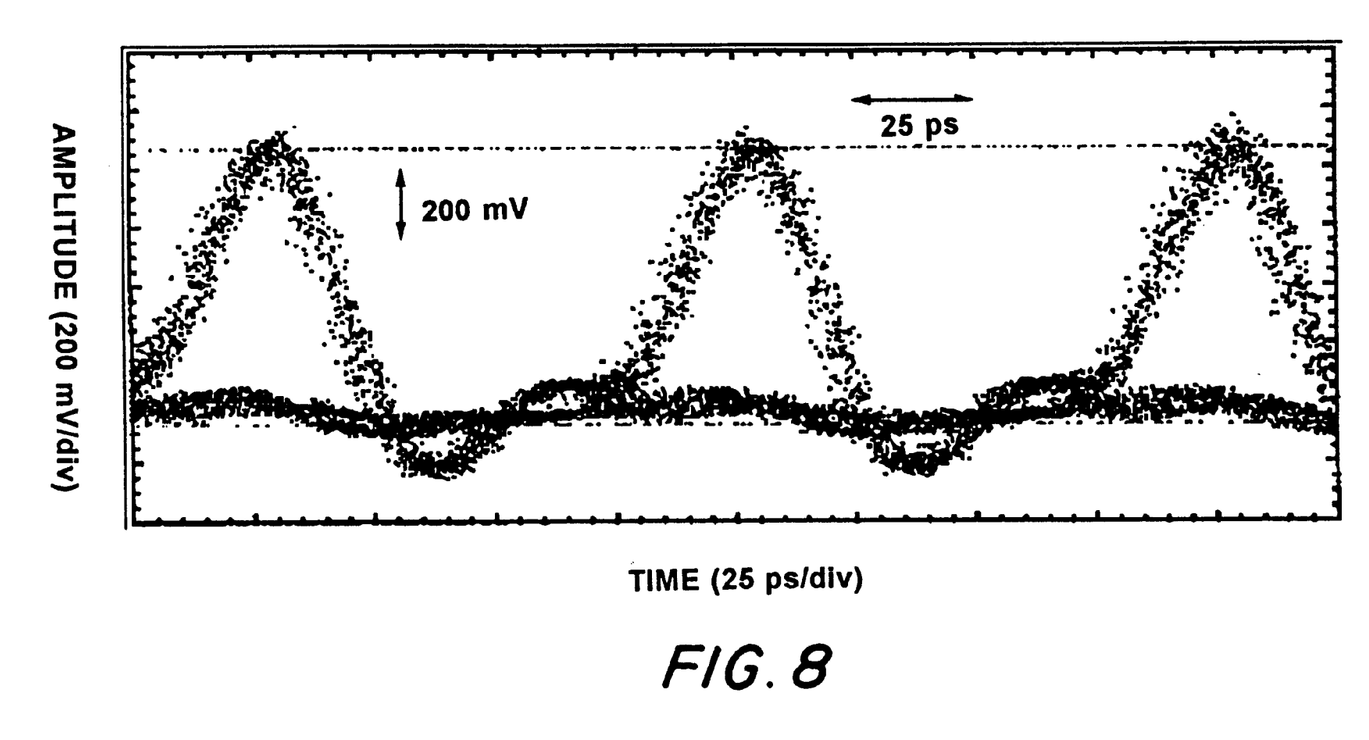
FIG. 8 is a graphical view of output of a photodetector according to an embodiment of the present invention.

An example of results using the high current optical photoreceiver according to the present invention is illustrated in FIG. 8. A high input sensitivity was not desired, so the intermediate stage was omitted and the input optical signal level was large enough to cause the high power EDFA 48 to go into compression. An unterminated 20 GHz photodetector was used which was capable of detecting greater than 20 mA peak current thereby creating a 1 volt peak-to-peak output from the photodetector. As illustrated in FIG. 8, relatively insignificant pulse distortion is observed in a resulting eye diagram for a 10 Gbps return-to-zero data stream.

While the amplifiers used in the above description have been described as being erbium doped fiber amplifiers, typically used for operation near 1550 nm, it is understood that a variety of alternate lanthanide rare earth dopants and/or host glasses or crystals may be used at alternate operation wavelengths. Some alternative dopants and the appropriate wavelength bands include:

Neodymium-doped silica fiber can be used for operation at wavelengths of, e.g., 1040–1110 nm.

Ytterbium-doped silica fiber can be used for operation at wavelengths of 1020–1160 nm.

Praseodymium-doped fluorozirconate fiber can be used for operation at wavelengths of 1275–1340 nm.

Thulium-doped silica fiber can be used for operation at wavelengths of 1620–2000 nm.

Thulium-doped fluorozirconate fiber can be used for operation at wavelengths of 1440–1500 nm.

Thulium-doped fluorozirconate fiber can be used for operation at wavelengths of 780–830 nm.

Dysprosium-doped chalcogenide fiber can be used for operation at wavelengths of 1280–1350 nm.

Neodymium-doped yttrium aluminum garnet (YAG) crystal, in bulk or waveguide form, can be used for operation at discrete wavelengths in the range of 1040–1140 nm, and/or 1300–1350 nm.

Likewise, the host material for the optical amplifiers may be in the form of a fiber, as described above, or may be in the form of waveguides in a glass or crystal. In effect, any gain dopant, in an appropriate host, may be used to provide the necessary optical gain and optical power. The dopant (Er, Nd, Yb, Tm, Pr, etc.), host material (silica glass, fluorozirconate glass, phosphate glass, chalcogenide glass, tellurite glass, YAG crystal, etc.), and physical form (fiber, bulk crystals, waveguides in bulk glasses, or waveguides in bulk crystals) are to be selected in order to provide gain and optical power at the wavelength of interest.

In addition to lanthanide rare earth doped optical amplifiers, it is also possible to use amplifiers based on stimulated Raman scattering in fibers. In a Raman amplifier, a high power pump source is launched into a length of single mode optical fiber. In silica fiber, Raman scattering of the pump provides gain at wavelengths shifted by 375–500 cm$^{-1}$ (in frequency) to the red of the pump wavelength. Using Raman amplifiers in the invention allows the apparatus to operate at any wavelength, so long as a pump source is provided that is of a wavelength shorter than the wavelength of interest by an equivalent frequency equal to the Stokes shift in the glass from which the fiber is fabricated.

Although the input light has been described above as a 1550 nm modulated light input, it is understood that optical amplifiers appropriate for 1.3 micron Wavelengths could be used at 1.3 $\mu$m, and so forth. A dc level shifter could be used at the photodetector output to provide exact logic levels for a variety of logic families, such as ECL, PECL, ECL 10 k, etc. In addition, any high power photodetector design can be used, including p-i-n, metal-semiconductor-metal ("MSM"), Schottky, waveguide, travelling wave, velocity-matched distributed, etc.

Although a few preferred embodiments of the present invention have been shown and described, it will be appreciated by those skilled in the art that chances may be made in these embodiments without departing from the principles and spirit of the invention, the scope of which is defined in the claims and their equivalents.

What is claimed is:

1. An apparatus comprising:
a first optical amplifier which amplifies an optical signal;
a high current photodetector which inputs and converts the amplified optical signal into an electrical signal; and
wherein output signal levels of said high current photodetector are approximately equal to 1 volt peak-to-peak, 0.5 volts peak-to-peak, and 0.25 volts peak-to-peak for systems with data rates of 1 to 10 Gbps, 10 to 40 Gbps, and 40 to 100 Gbps, respectively.

2. An apparatus comprising:
a first optical amplifier which amplifies an optical signal;
a high current photodetector which inputs and converts the amplified optical signal into an electrical signal; and
wherein an amplitude-limited output voltage is obtained directly from said photodetector, high frequency cutoff is determined by a bandwidth of said photodetector at high currents, and low frequency cutoff is determined by gain dynamics of said first optical amplifier.

3. The apparatus according to claim 2 wherein:
said first optical amplifier includes automatic gain control for output signal leveling at a desired operation point.

4. The apparatus according to claim 2 wherein:
said apparatus is an optical receiver.

5. The apparatus according to claim 2, further comprising:
a retiming circuit driven by the electrical signal wherein the electrical signal has a power level sufficient to drive said retiming circuit without requiring further amplification.

6. The apparatus according to claim 5 wherein:
said retiming circuit includes a clock recovery circuit.

7. The apparatus according to claim 5 wherein:
said retiming circuit includes a decision making element for reshaping the electrical signal.

8. The apparatus according to claim 7 wherein:
said decision making element is a flip flop.

9. An apparatus comprising:
a first optical amplifier which amplifies an optical signal;
a high current photodetector which inputs and converts the amplified optical signal into an electrical signal; and
a second optical amplifier for amplifying the optical signal prior to amplification by said first optical amplifier, wherein said second optical amplifier has an input 3 dB compression point lower than the desired input sensitivity at a desired bit rate.

10. The apparatus according to claim 9 further comprising:
a third optical amplifier which further amplifies the optical signal prior to amplification by said first amplifier, wherein said third optical amplifier provides linear gain.

11. The apparatus according to claim 9 further comprising:
a third optical amplifier which further amplifies the optical signal prior to amplification by said first amplifier, wherein said third optical amplifier provides linear gain, and has a noise figure less than 10 dB.

12. The apparatus according to claim 11, further comprising:
an impedance matching resistor positioned in parallel with said photodetector.

13. The apparatus according to claim 12 further comprising:
a bandpass filter, positioned between said second optical amplifier and said first optical amplifier, and having a passband that includes the optical signal.

14. The apparatus according to claim 12 further comprising:
   a bandpass filter, positioned between said second optical amplifier and said third optical amplifier, and having a passband that includes the optical signal.

15. An apparatus comprising:
   a first optical amplifier for amplifying a signal to an amplified signal;
   a high current photodetector for converting the amplified signal to an electrical signal;
   a retiming circuit driven by the electrical signal, wherein the electrical signal has a power level sufficient to drive said retiming circuit without requiring further amplification; and
   wherein output signal levels of said high current photodetector are approximately equal to 1 volt peak-to-peak, 0.5 volts peak-to-peak, and 0.25 volts peak-to-peak for systems with data rates of 1 to 10 Gbps, 10 to 40 Gbps, and 40 to 100 Gbps, respectively.

16. The apparatus according to claim 15 wherein:
   said retiming circuit includes a clock recovery circuit.

17. The apparatus according to claim 15 wherein:
   wherein said retiming circuit includes a decision making element for reshaping the electrical signal.

18. The apparatus according to claim 17 wherein:
   said decision making element is a flip flop circuit.

19. The apparatus according to claim 15, wherein:
   said first optical amplifier includes automatic gain control for output signal leveling at a desired operation point of the apparatus.

20. The apparatus according to claim 19 further comprising:
   a second optical amplifier for amplifying the optical signal prior to amplification by said first optical amplifier, wherein said second optical amplifier has an input 3 dB compression point lower than the desired input sensitivity at a desired bit rate.

21. The apparatus according to claim 20 further comprising:
   a third optical amplifier which further amplifies the optical signal prior to amplification by said first amplifier, wherein said third optical amplifier provides linear gain.

22. The apparatus according to claim 21 further comprising:
   an impedance matching resistor, positioned to parallel with said photodetector.

23. The apparatus according to claim 22 further comprising:
   a band filter, positioned between said second optical amplifier and said first optical amplifier, having a passband that includes the optical signal.

24. The apparatus according to claim 23 further comprising:
   a bandpass filter, positioned between said second optical amplifier and said third optical amplifier, having a passband that includes the optical signal.

25. An optical receiver for receiving an optical signal from an optical fiber in a fiber-optic digital transmission system, comprising:
   a first optical amplifier for amplifying the optical signal said first optical amplifier having an input 3 dB compression point lower than a desired input sensitivity at a desired bit rate;
   a second optical amplifier for further amplifying the amplified optical signal, having an automatic gain control for output signal leveling at a desired operation point of the transmission system;
   a photodetector for converting the further amplified optical signal from said second optical amplifier to an electrical signal; and
   a retiming circuit driven by the electrical signal, wherein the electrical signal has a power level sufficient to drive said retiming circuit without requiring further amplification, and output signal levels of said photodetector are approximately equal to 1 volt peak-to-peak, 0.5 volts peak-to-peak, and 0.25 volts peak-to-peak for systems with data rates of 1 to 10 Gbps, 10 to 40 Gbps, and 40 to 100 Gbps, respectively, and said retiming circuit includes a clock recovery circuit and a decision circuit for data reshaping.

26. The optical receiver according to claim 25, further comprising a third optical amplifier positioned between said first optical amplifier and said second optical amplifier for providing linear gain.

27. An optical receiver according to claim 25 further comprising:
   a third optical amplifier that provides linear gain and has a noise figure less than 10 dB, said third optical amplifier positioned between said first optical amplifier and said second optical amplifier.

\* \* \* \* \*

UNITED STATES PATENT AND TRADEMARK OFFICE
CERTIFICATE OF CORRECTION

PATENT NO.      : 6,384,948 B1
DATED           : May 7, 2002
INVENTOR(S)     : Williams et al.

It is certified that error appears in the above-identified patent and that said Letters Patent is hereby corrected as shown below:

Title page,
Item [74], *Attorney, Agent, or Firm*, "John G. Mills" should be corrected to read
-- John Gladstone Mills III --

Signed and Sealed this

Twenty-seventh Day of July, 2004

JON W. DUDAS
*Acting Director of the United States Patent and Trademark Office*